Dec. 1, 1936.   I. H. LEVIN   2,062,321
METHOD AND APPARATUS FOR HEAT INTERCHANGE
Original Filed July 14, 1933   2 Sheets-Sheet 1
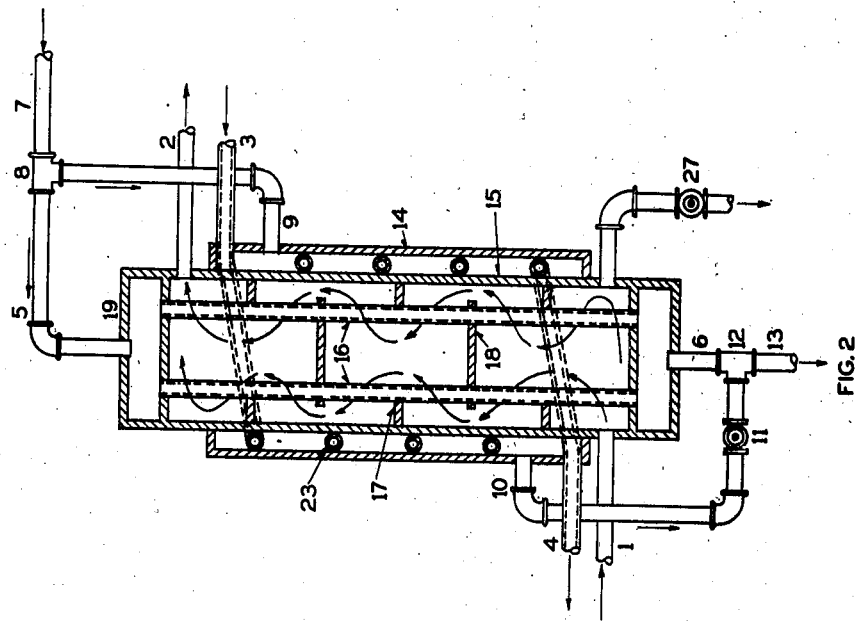
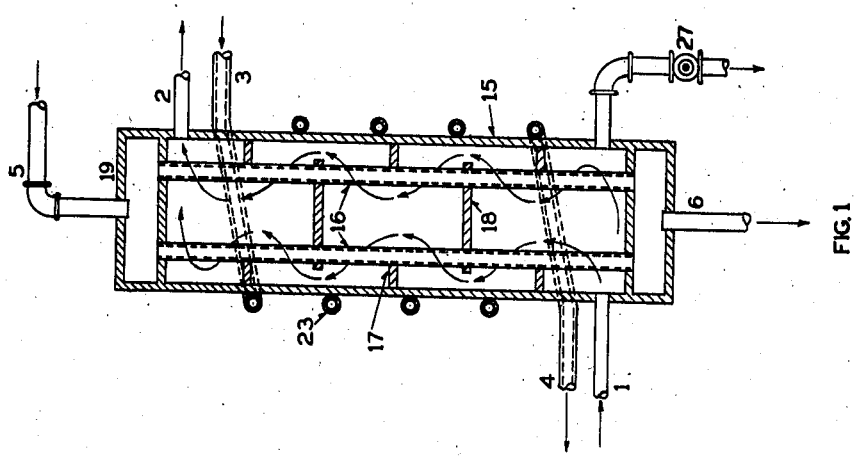
INVENTOR
Isaac H Levin Dec. 1, 1936.                I. H. LEVIN                2,062,321
              METHOD AND APPARATUS FOR HEAT INTERCHANGE
                 Original Filed July 14, 1933    2 Sheets-Sheet 2

INVENTOR
Isaac H Levin

Patented Dec. 1, 1936

2,062,321

UNITED STATES PATENT OFFICE 2,062,321

METHOD AND APPARATUS FOR HEAT INTERCHANGE

Isaac H. Levin, Pittsburgh, Pa.

Application July 14, 1933, Serial No. 680,378
Renewed September 2, 1936

5 Claims. (Cl. 257—246)

The invention relates to heat interchangers as used for the separation of air and other gaseous mixtures into their constituents by the usual method of liquefaction and rectification. While my improved method may be advantageously employed for heat transfer units in the separation of gases generally from their mixtures, the description will refer to the separation of air into its constituents.

Some of the advantages of my invention and means for obtaining these advantages will be clearly set forth in the following description of and in the accompanying drawings of apparatus that will serve as examples of my invention.

Figure 1 is a section through a heat transfer unit embodying my invention.

Figure 2 is a section through a modification of Figure 1.

Figure 4:
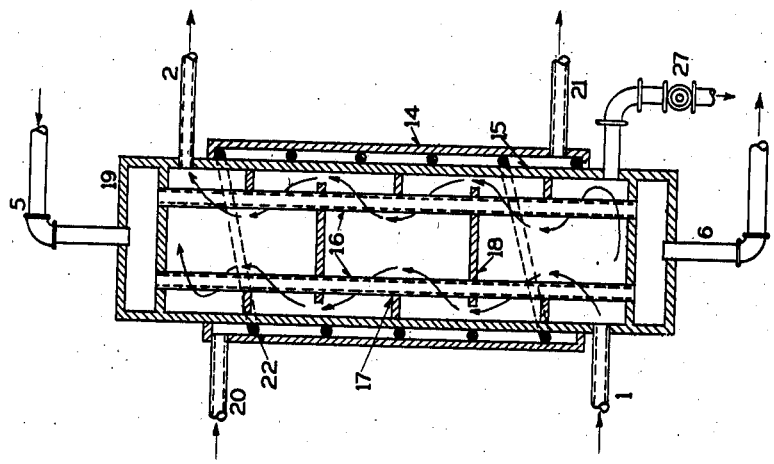
Figure 4 is a section through a modification of Figure 3.

In the tubular interchangers commonly used in such arts as separating air into its constituents, problems arise due to the fact that the air has to transfer heat to both oxygen and nitrogen, and often to argon also. Further difficulties arise from the fact that the air is under considerable pressure above that of the products into which the air is separated. Still further difficulties may arise when one of the constituents, such as oxygen or argon, is to be removed under pressure.

In the general type of interchangers now used, the products of separation may pass through a number of tubes in parallel, some for oxygen, others for nitrogen and still others for argon. These tubes are affixed to a common tube sheet and each gas issuing from a given set of tubes is collected in a cap attached to the tube sheet. The combined tube bundles with tube sheet and caps are placed within a shell and properly enclosed, and the air to be separated enters the shell, then passes around the tubes, often between baffles. The ends of the shell are fitted with enclosures to retain the air. This shell in turn is surrounded by insulating material.

I have found that I can overcome many of the difficulties due to possible gas leaks, and other difficulties due to constructing an interchanger for so many gases, and I can, furthermore, very considerably reduce the cost of manufacturing a heat transfer unit, and also considerably improve the heat transfer efficiency, and the capacity, by constructing the interchanger and operating the same in a manner described in my invention.

Figure 1 is a section through a heat transfer unit embodying my invention. This unit consists of a shell 15 and tube bundle 16. Air enters interchanger at 1 and leaves at 2. It passes within the shell 15 and around the tubes 16 in which nitrogen flows. As the air rises, passing between baffles 18, it becomes progressively cooler as does also the surface of jacket 15. A pipe 23 is coiled about the jacket 15 and a cold gas, say oxygen or a refrigerant, is made to circulate through this pipe entering at 3 and leaving at 4. Heat transfer is thus brought about between the fluid in pipe 23 and the air within shell 15. Nitrogen enters the tubes 16 by first entering pipe 5, and then cap 19, and finally leaves at 6.

If oxygen is to be removed under pressure, as described in my co-pending application Serial No. 670,146, 1933, the oxygen under pressure can enter the coil 23, and as the oxygen passes through this coil circulating about the shell, the temperature of the oxygen rises as the coil 23 comes in contact with warmer portions of the shell, until the oxygen finally leaves at 4 at substantially the temperature of the incoming air at 1. This type of heat transfer unit represents considerable saving over the general type of interchangers used wherein the oxygen would have to pass through tubes parallelling the nitrogen tubes 16. The oxygen is at a much higher pressure than the pressure of the air. This requires the tube sheet to be of expensive construction; likewise the cap which would enclose the ends of the oxygen tubes and be used as a collector for the high pressure oxygen, would be bulky and of expensive construction. The space required for this cap and the large bolts necessary to clamp the cap to the tube sheet increase the diameter of the interchanger appreciably, and also introduces a large amount of waste space. The increased surface causes an increase in heat loss. The increase in weight increases the amount of refrigeration and time necessary to cool the interchanger. The expedient of bringing the heat transfer to take place between one of the gases, say, the oxygen and the air through the wall of the shell, obviates the difficulties now encountered when the oxygen in addition to the other gases is brought in heat transfer contact with the air within the shell.

Figure 2 is a section through a modification of Figure 1. In addition to the details of construction and manner of operation, as shown and described under Figure 1, the coil 23 may be encased in a shell 14, and part of the nitrogen flowing into tubes 16 may be diverted into the space between shell 14 and shell 15. Under Figure 1, the coil 23 is made to contact shell 15, either by pressure or by means of fusion or soldering. In an apparatus, as described under Figure 2, coil 23 may receive additional heat transfer contact by means of the nitrogen flowing around the coil. The nitrogen in this case heat transfers with the air through the wall of the shell 15 and also with the walls of coil 23. It is often difficult to make good contact between coil 23 and the shell. The use of the nitrogen avoids the necessity of a mechanical contact between coil 23 and shell 15, and substitutes therefor a fluid contact which circulates around the coil and against the shell 15. The nitrogen enters, say, at the top of the interchanger through pipe 5. A portion of the nitrogen is by-passed at joint 8 and enters the space between shell 14 and 15 at 9. It circulates into the space formed between shells 14 and 15 and around the coil 23, leaving at 10, passing through valve 11, joins the nitrogen coming through the tubes through pipe 6 at joint 12, and then leaves at 13. The amount of nitrogen to be circulated or by-passed can be controlled by valve 11. In the event that liquid oxygen is to be produced, there remains but the heat transfer between the air and the nitrogen. This type of interchanger can also be used for the nitrogen and air heat transfer, by sending some of the nitrogen through the tubes 16 and the remainder in the space between shells 14 and 15, and also through coil 23 in addition. Coil 23 can also serve for argon, or, in the event that the argon is allowed to pass out with the nitrogen and the oxygen, a refrigerant such as ammonia or carbon dioxide can be sent through coil 23. The air entering these interchangers at 1 usually contains moisture. A certain amount of refrigeration is necessary to condense said moisture. This additional refrigeration can be supplied by the refrigerant already referred to instead of producing such refrigeration by means of air. Valves 27 serve to drain off moisture which collects within the interchanger.

Figure 3:
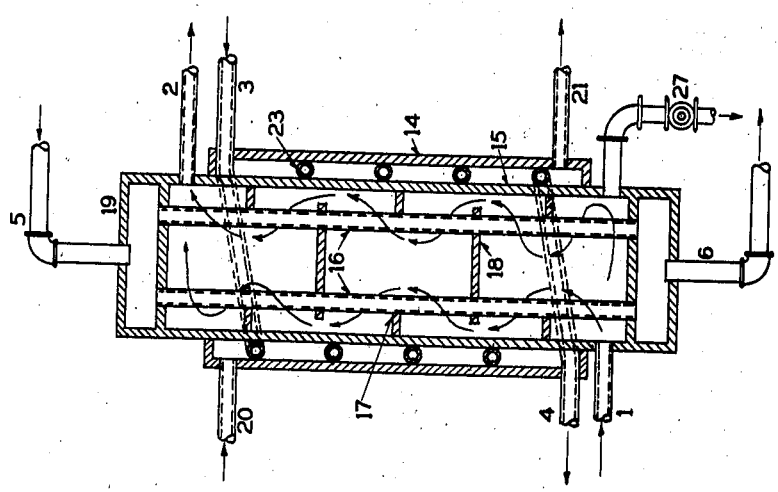
Figure 3 is a section through a modification of Figure 2.

Figure 3 is a section through a modification of Figure 2. Where oxygen is to be removed and in addition argon, the oxygen gas may pass through coil 23 and the argon may be allowed to pass into the space formed between shells 14 and 15, the argon entering at 20 and leaving at 21. Argon gas could also be sent through 23, entering at 3 and leaving at 4, and the oxygen can be sent into 20 and leave at 21. In case only oxygen and nitrogen are removed, the oxygen may be sent through coil 23 and a refrigerant may be caused to circulate between shells 14 and 15 by entering at 20 and leaving at 21, or the refrigerant may be sent through coil 23 and the oxygen sent into the space formed between the shells 14 and 15, entering at 20 and leaving at 21.

Figure 4 is a section through a modification of Figure 3. Instead of passing the oxygen through a coil as shown at 23, a tube or wire 22 may be wound about the shell 15. This wire may then be encased by surrounding same with shell 14. The oxygen gas may then enter at 20 and circulate about shell 15 into the space formed by means of 22 and shell 14, and then leave the interchanger at 21. This form of interchanger is very convenient and very efficient, permitting very small differences of temperature in the order of 1 to 2° C. between the oxygen and the air.

In Figures 1, 2 and 3, a gas under pressure, say, liquid oxygen gasifying up to the pressure of portable cylinders, that is, 2200 pounds per square inch, may be brought into very efficient heat transfer contact with the incoming air by permitting the high pressure oxygen to pass within coil 23. These interchangers in Figures 1 to 4 inclusive, are shown with the air entering the bottom thereof and leaving at the top, with the nitrogen entering at the top and leaving at the bottom. These interchangers may also be operated by inverting the same, so that the air would enter at 2 and descend through the interchanger, leaving at 1, and the nitrogen would enter at 6 and rise through the tubes, leaving at 5. Likewise, the air passing through 23 would be reversed and the gas entering at 20 would be reversed, in order that the air will be in counter current with the constituents separated from the air. In case a refrigerant is used, the refrigerant may be applied either in counter current or in parallel with the incoming air.

In some methods of separating air into its constituents, air at different pressures may be used. Air under one pressure may be sent into shell 15 through pipe 1, and the air under another pressure may be sent through 23, entering at 4 and leaving at 3, as in Figures 1, 2, and 3, or such air may enter the space between shells 14 and 15 by entering at 21 and leaving at 20, as in Figure 4, or in 23 and/or in the space between shells 14 and 15 as per Figure 3. In Figure 3, whichever space is not used for air can be used for a product of separation, say, the oxygen or argon. If argon or oxygen is to be removed as a liquid and evaporated under pressure, the passages in pipe 23 may be preferred to the space between shells 14 and 15. Furthermore, whichever space is not used for air may be used for a refrigerant, such as ammonia or the like. Furthermore, air under one pressure may be sent within the shell 15 and around the tubes 16, and air under a different pressure may be sent in the space between shells 14 and 15, or within coil 23, while a refrigerant, such as ammonia or carbon dioxide, passes through tubes 16 instead of nitrogen, or any of the other products of separation.

In some method of separating air into its constituents, both air and nitrogen are supplied to the column, the latter serving as reflux for the distillation column. Under these conditions, either effluent nitrogen or a refrigerant, such as ammonia, may pass through tubes 16 and the air may be sent through the shell while the nitrogen may pass through coil 23 and/or the space between shells 14 and 15. Furthermore, air may be sent into shell 15 at one pressure, and through coil 23 at another pressure, while nitrogen may be sent through the space between shells 14 and 15, and thence to the distilling column, while either a refrigerant may be sent into tubes 16 or nitrogen as effluent from the column may be sent into tubes 16.

I claim:

1. An apparatus for the exchange of heat comprising fluid conducting tubes, a fluid receiving chamber and a fluid discharge chamber connected by said fluid conducting tubes, a shell surrounding said tubes and forming a gas space between the wall of said tubes and the wall of said shell, inlet and outlet means for passing a fluid into and out of the said space, means for giving said fluid a sinuous motion during its passage through said space to bring about improved heat transfer between the fluid and the wall of the shell, fluid conducting means coiled about the exterior surface of said shell, a casing covering the said means and forming a gas space between the exterior wall of the shell and the casing, inlet and outlet means for passing a fluid into and out of said second mentioned space.

2. An apparatus for the exchange of heat comprising fluid conducting tubes, a fluid receiving chamber, and a fluid discharge chamber connected by said fluid conducting tubes, a shell surrounding said tubes and forming a gas space between the wall of said tubes and the wall of said shell, inlet and outlet means for passing a fluid into and out of said space, means for giving said fluid a sinuous motion during its passage through said space to bring about improved heat transfer between the fluid and the wall of the shell, a tube for the passage of a fluid therethrough positioned about the exterior of said shell, a casing covering the said tube and forming a gas space between the exterior wall of the shell and the casing, means for supplying the same fluid to the fluid receiving chamber and to said space between the shell and the casing.

3. An apparatus for the exchange of heat between air and the products of separation of the air consisting of a larger portion containing nitrogen and a smaller portion containing oxygen, comprising fluid conducting tubes in parallel for the said larger portion, a fluid receiving chamber and a fluid discharge chamber connected by said fluid conducting tubes, a shell enclosing the said tubes, means for passing the air into and out of the said shell, means causing the air in its passage through the shell to flow across the tubes in successive zones and in alternating direction, gas conducting means positioned about the exterior surface of said shell for the said smaller portion, means causing the said smaller portion to follow a tortuous path while in heat transfer contact with the successive zones within the shell.

4. A method of producing heat transfer between air and the products of separation of the air consisting of a larger portion containing nitrogen and a smaller portion containing oxygen, passing the air in successive steps and in alternating direction across the several parallel paths of flow of the nitrogen portion, thereby producing zones of temperature in the air stream and lowering the heat content of the air, bringing the oxygen portion along a tortuous path in heat transfer contact with the zones of temperature of the air to further reduce the heat content of the air.

5. A method of producing heat transfer between a gaseous mixture and the products of separation of the said gaseous mixture, comprising passing the gaseous mixture in successive steps and in alternating directions across several parallel paths of flow of a product of separation, thereby producing zones of temperature in the stream of flow of gaseous mixture and lowering the heat content of the gaseous mixture, bringing another product of separation in a tortuous path in heat transfer contact with the zones of temperature of the gaseous mixture to further reduce the heat content of the said gaseous mixture.

ISAAC H. LEVIN.